(12) United States Patent
Addiego

(10) Patent No.: US 8,716,165 B2
(45) Date of Patent: May 6, 2014

(54) CATALYSTS ON SUBSTRATES AND METHODS FOR PROVIDING THE SAME

(75) Inventor: William Peter Addiego, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 584 days.

(21) Appl. No.: 12/112,609

(22) Filed: Apr. 30, 2008

(65) Prior Publication Data

US 2009/0274903 A1 Nov. 5, 2009

(51) Int. Cl.
  *B01J 23/00* (2006.01)
  *B01J 21/00* (2006.01)

(52) U.S. Cl.
  USPC ........... 502/104; 502/302; 502/303; 502/304; 502/325; 502/326; 502/327; 502/328; 502/329; 502/330; 502/331; 502/332; 502/333; 502/334; 502/335; 502/336; 502/337; 502/338; 502/339; 502/340; 502/341; 502/342; 502/343; 502/344; 502/345; 502/346; 502/347; 502/348; 502/349; 502/350; 502/351; 502/352; 502/353; 502/354; 502/355; 502/415; 502/439; 502/240; 502/300

(58) Field of Classification Search
  USPC ......... 502/104, 302, 303, 304, 325–439, 240, 502/300
  See application file for complete search history.

(56) References Cited

U.S. PATENT DOCUMENTS

| | | | |
|---|---|---|---|
| 3,873,469 A | 3/1975 | Foster et al. | 11/40 |
| 4,499,194 A * | 2/1985 | Harada et al. | 502/8 |
| 4,714,694 A * | 12/1987 | Wan et al. | 502/304 |
| 4,727,052 A | 2/1988 | Wan et al. | 21/4 |
| 4,859,432 A * | 8/1989 | David et al. | 423/21.1 |
| 4,914,072 A * | 4/1990 | Grice et al. | 502/208 |
| 4,943,550 A * | 7/1990 | Kolts et al. | 502/327 |
| 5,057,483 A * | 10/1991 | Wan | 502/304 |

(Continued)

FOREIGN PATENT DOCUMENTS

| | | | |
|---|---|---|---|
| CN | 87106740 | 5/1988 | |
| EP | 0262962 | 6/1988 | ............ B01D 53/36 |

(Continued)

OTHER PUBLICATIONS

Reddy et at., "Direct decomposition of nitrous oxide over $Ru/Al_2O_3$ catalysts prepared by deposition-precipitation method", Catalysis Communications 8 (2007) 1406-1410.

(Continued)

*Primary Examiner* — Cam N. Nguyen
(74) *Attorney, Agent, or Firm* — Jason A. Barron

(57) ABSTRACT

A method for providing a catalyst on a substrate is disclosed comprising providing a first washcoat comprising a soluble washcoat salt species, a polar organic solvent, and an insoluble particulate material, contacting the first washcoat with a substrate to form a coated substrate, and then contacting the coated substrate with a second washcoat comprising an oxide or an oxide-supported catalyst to physisorb, chemisorb, bond, or otherwise adhere the oxide or the oxide-supported catalyst to the coated substrate. Also disclosed is a catalyst on a substrate comprising: a substrate; an anchor layer comprising a soluble washcoat salt species, a polar organic solvent, and an insoluble particulate material; and a second layer comprises an oxide or an oxide-supported catalyst. The catalyst on a substrate can be in either green or fired form.

8 Claims, 1 Drawing Sheet

(56) References Cited

U.S. PATENT DOCUMENTS

| | | | |
|---|---|---|---|
| 5,063,193 A * | 11/1991 | Bedford et al. | 502/304 |
| 5,139,985 A * | 8/1992 | Barbe' et al. | 502/109 |
| 5,185,305 A * | 2/1993 | Subramanian et al. | 502/65 |
| 5,258,342 A * | 11/1993 | Luciani et al. | 502/107 |
| 5,288,470 A * | 2/1994 | Cornelison et al. | 422/177 |
| 5,334,570 A * | 8/1994 | Beauseigneur et al. | 502/304 |
| 5,597,771 A * | 1/1997 | Hu et al. | 502/304 |
| 5,856,263 A * | 1/1999 | Bhasin et al. | 502/333 |
| 5,965,481 A | 10/1999 | Durand et al. | |
| 5,981,427 A | 11/1999 | Sung et al. | |
| 5,989,507 A | 11/1999 | Sung et al. | 8/2 |
| 6,022,825 A * | 2/2000 | Andersen et al. | 502/303 |
| 6,139,814 A * | 10/2000 | Shigapov et al. | 423/592.1 |
| 6,168,775 B1 * | 1/2001 | Zhou et al. | 423/584 |
| 6,171,999 B1 * | 1/2001 | Takemoto et al. | 502/304 |
| 6,294,140 B1 * | 9/2001 | Mussmann et al. | 423/213.5 |
| 6,632,530 B1 | 10/2003 | Clough | 5/16 |
| 6,777,370 B2 * | 8/2004 | Chen | 502/304 |
| 7,037,878 B2 * | 5/2006 | Liu et al. | 502/326 |
| 7,163,963 B2 * | 1/2007 | Fraenkel | 518/715 |
| 7,214,643 B2 | 5/2007 | Yamamoto et al. | |
| 7,374,729 B2 * | 5/2008 | Chen et al. | 422/177 |
| 7,559,993 B1 * | 7/2009 | Patel et al. | 134/1 |
| 7,601,671 B2 * | 10/2009 | LaBarge | 502/326 |
| 7,745,367 B2 * | 6/2010 | Fujdala et al. | 502/60 |
| 7,749,472 B2 * | 7/2010 | Chen et al. | 423/213.2 |
| 8,318,629 B2 * | 11/2012 | Alive et al. | 502/304 |
| 2002/0082163 A1 * | 6/2002 | Yan et al. | 502/304 |
| 2003/0004060 A1 * | 1/2003 | Shigapov et al. | 502/304 |
| 2004/0004029 A1 * | 1/2004 | Khare et al. | 208/208 R |
| 2004/0101452 A1 * | 5/2004 | LaBarge et al. | 422/177 |
| 2004/0175313 A1 * | 9/2004 | Foor et al. | 423/219 |
| 2004/0198595 A1 * | 10/2004 | Chen | 502/328 |
| 2005/0100492 A1 * | 5/2005 | Hoke et al. | 423/219 |
| 2005/0129589 A1 | 6/2005 | Wei et al. | 1/40 |
| 2005/0164879 A1 * | 7/2005 | Chen | 502/328 |
| 2006/0013760 A1 * | 1/2006 | Shi et al. | 423/648.1 |
| 2008/0038172 A1 * | 2/2008 | Chen et al. | 423/213.2 |
| 2008/0112870 A1 * | 5/2008 | Moini et al. | 423/237 |
| 2008/0125309 A1 * | 5/2008 | Fujdala et al. | 502/74 |
| 2010/0061903 A1 * | 3/2010 | Kohara et al. | 423/213.2 |

FOREIGN PATENT DOCUMENTS

| | | | |
|---|---|---|---|
| EP | 0787522 | 8/1997 | B01D 53/94 |
| EP | 1340541 | 9/2003 | B01J 35/04 |
| WO | WO95/00235 | 1/1995 | B01D 53/36 |

OTHER PUBLICATIONS

Jung et al., "Doping effect of precious metal on the activity of CuO-CeO$_2$ catalyst for selective oxidation of CO", Applied Catalysis A: General 331 (2007) 112-120.

Agrafiotis et al., "The effect of powder characteristics on washcoat quality. Part II: Zirconia, titania washcoats—multilayered structures", Journal of the European Ceramic Society 20 (2000) 825-834.

* cited by examiner

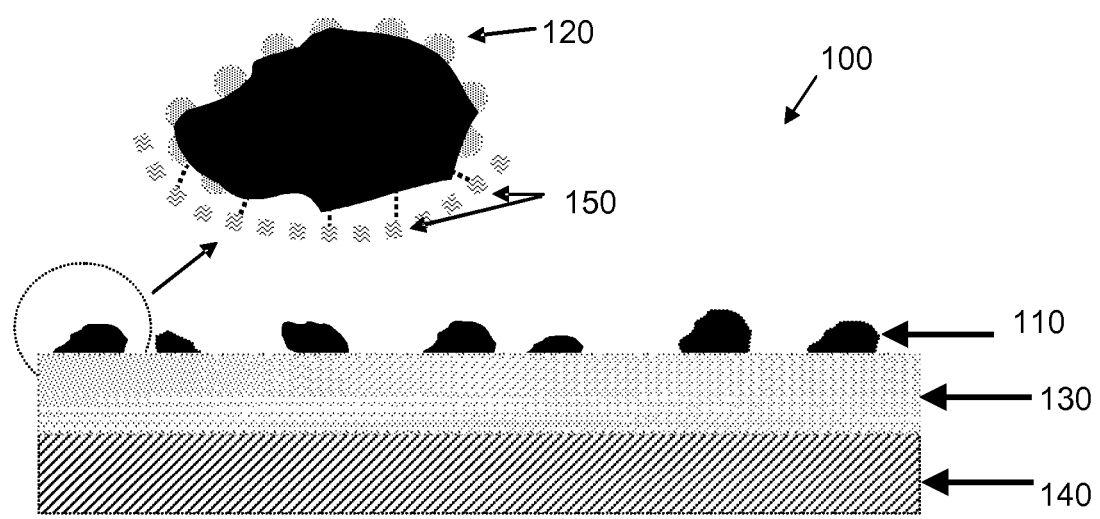

CATALYSTS ON SUBSTRATES AND METHODS FOR PROVIDING THE SAME

TECHNICAL FIELD

The present invention relates generally to catalysts on substrates and methods for providing the same, and more particularly to oxide or oxide-supported catalysts on substrates and methods for providing the same.

BACKGROUND

Developing highly active, supported catalysts is of continued and growing interest. Supported catalyst systems can aid in reducing air pollution from power plants, refineries, and other chemical processing plants in addition to being useful in many other industrial applications. Supported catalyst systems can also be designed to reduce volatile organic compound (VOC) emissions from operations such as, for example, printers, dry cleaners, paint shops, and plastic-mold shops.

Supported catalyst materials can be used for a variety of chemical transformations, such as, for example, in hydrodesulfurization, hydrogenation, methanation, methanol synthesis, ammonia synthesis, carbon monoxide oxidation, and various petrochemical processes. Moreover, expensive catalysts, such Pd or Pt based catalysts can be supported such that the catalyst can be recycled.

It can be desirable to apply a catalyst to a substrate to enhance dispersion of the supported catalyst. The substrate can function, for example, as a form factor for the catalyst during operation. Current methods to apply catalysts onto supports and substrates, however, can be limited by incompatibilities (e.g. a lack of bonding capability) between the catalyst material and the substrate. Such methods for manufacturing supported catalysts can also ultimately lead to a loss of catalyst dispersion and/or a loss of catalytic activity.

There is a need to address the aforementioned problems and other shortcomings associated with traditional catalyst materials and methods.

SUMMARY

The present disclosure relates to multilayered catalyst supports and methods for the manufacture and use thereof. The present disclosure addresses at least a portion of the problems described above through the use of multilayered catalyst supports, and methods of making and using the disclosed multilayered catalyst supports.

In one embodiment, a method for providing a catalyst on a substrate is disclosed comprising providing a first washcoat comprising a soluble washcoat salt species, a polar organic solvent, and an insoluble particulate material, contacting the first washcoat with a substrate to form a coated substrate, and then contacting the coated substrate with a second washcoat comprising an oxide or an oxide-supported catalyst to physisorb, chemisorb, bond, or otherwise adhere the oxide or the oxide-supported catalyst to the coated substrate.

In another embodiment, a catalyst on a substrate comprising: a) a substrate having at least one surface; b) an anchor layer contacting at least a portion of the at least one surface, comprising a soluble washcoat salt species, a polar organic solvent, and an insoluble particulate material; and c) a second layer positioned on at least a portion of the anchor layer oppositely disposed from the substrate, wherein the second layer comprises an oxide or an oxide-supported catalyst is described.

In yet another embodiment, a catalyst on a substrate comprising a substrate having at least one surface, an anchor layer contacting at least a portion of the at least one surface, and a second layer positioned on at least a portion of the anchor layer oppositely disposed from the substrate, wherein the anchor layer comprises a first oxide, wherein the second layer comprises a second oxide or an oxide-supported catalyst, and wherein both the anchor layer and the second layer comprise substantially no binder is disclosed.

Additional aspects and advantages of the disclosure will be set forth, in part, in the detailed description and any claims which follow, and in part will be derived from the detailed description or can be learned by practice of the various aspects of the disclosure. The advantages described below will be realized and attained by means of the elements and combinations particularly pointed out in the appended claims. It is to be understood that both the foregoing general description and the following detailed description are exemplary and explanatory only and are not restrictive of the disclosure.

BRIEF DESCRIPTION OF THE FIGURES

The accompanying drawings, which are incorporated in and constitute a part of this specification, illustrate certain examples of the present disclosure and together with the description, serve to explain, without limitation, the principles of the disclosure. Like numbers represent the same elements throughout the figures.

FIG. 1 illustrates an exemplary embodiment of the invention.

DETAILED DESCRIPTION

The following description is provided as an enabling teaching of the disclosure in its best, currently known embodiment. To this end, those skilled in the relevant art will recognize and appreciate that many changes can be made to the various embodiments of the disclosure described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

In this specification and in the claims which follow, reference will be made to a number of terms which shall be defined to have the following meanings:

As used herein, the singular forms "a," "an" and "the" include plural referents unless the context clearly dictates otherwise. Thus, for example, reference to a "solvent" includes examples having two or more such "solvents" unless the context clearly indicates otherwise.

"Optional" or "optionally" means that the subsequently described event or circumstance can or cannot occur, and that the description includes instances where the event or circumstance occurs and instances where it does not.

Disclosed are the components to be used to prepare the disclosed compositions as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if there are a variety of additional steps that can be performed it is understood that each of these additional steps can be performed with any specific embodiment or combination of embodiments of the disclosed methods.

As used herein, a "wt. %" or "weight percent" or "percent by weight" of a component, unless specifically stated to the contrary, refers to the ratio of the weight of the component to the total weight of the composition in which the component is included, expressed as a percentage.

As used herein, the term "coating" is intended to refer to a suspension of components that, when applied to a substrate, can provide a high surface area surface suitable for stabilizing one or more oxides or oxide-supported catalysts particles.

As used herein, the term "washcoat" is intended to refer to a composition that can be applied to a substrate or a coated substrate.

As used herein, the terms "substrate" is intended to refer to a body onto which a coating and/or a washcoat can be deposited. A substrate includes a monolith and can have any form and/or geometry, such as, for example, honeycomb, stacked, coiled, woven, foamed, or a combination thereof, and can be comprised of any suitable substance for the intended application.

As used herein, the terms "nano" and "nano-particle" are intended to refer to particles having, in various aspects, at least one aspect with an average particle size of less than about 100 nm, less than about 10 nm, or less than about 5 nm.

It is understood that the catalysts on substrates disclosed herein have certain functions. Disclosed herein are certain structural requirements for performing the disclosed functions and it is understood that there are a variety of structures that can perform the same function that are related to the disclosed structures, and that these structures will typically achieve the same result.

Disclosed herein are catalysts on substrates and methods of making catalysts or supported catalysts on substrates. In various aspects of the present disclosure, a coating can be bound and/or adhered to a solid substrate, the coating having a composition and a means to bond and/or adhere to an oxide or an oxide-supported catalyst. The present disclosure allows for, in general, an oxide or an oxide-supported catalyst to be processed separately from a substrate and/or a coated substrate thereby overcoming at a least some adverse effects that can occur when the substrate, coated substrate, oxide, and/or oxide-supported catalyst are all processed together.

In one embodiment, a method for providing a catalyst on a substrate is disclosed comprising providing a first washcoat comprising a soluble washcoat salt species, a polar organic solvent, and an insoluble particulate material, contacting the first washcoat with a substrate to form a coated substrate, and then contacting the coated substrate with a second washcoat comprising an oxide or an oxide-supported catalyst to physisorb, chemisorb, bond, or otherwise adhere the oxide or the oxide-supported catalyst to the coated substrate.

In another embodiment, a catalyst on a substrate comprising: a substrate; an anchor layer comprising a soluble washcoat salt species, a polar organic solvent, and an insoluble particulate material; and a second layer comprising an oxide is described.

According to the invention, the catalyst on a substrate can be in either green or fired form.

Substrate

A substrate for use in the present disclosure can comprise any suitable material. Given that the substrate itself need not be exposed to the catalyst or the supported catalyst processing conditions, which can, in various aspects, adversely affect at least some substrate materials, the present disclosure allows for any or substantially any substrate to be used. The substrate can comprise an inorganic material, an organic material, or a combination thereof In one aspect, the substrate comprises a plurality of inner channels having surfaces defined by porous walls and extending through the substrate from a first face to a second face. The substrate can be a monolith, such as, for example, a honeycomb structure. Other monolith substrates can comprise pores of any shape, and a honeycomb, hexagonal structure is not a limiting feature of the present disclosure. A substrate, such as a monolith, can comprise any material suitable for being coated. In one aspect, a substrate comprises an inorganic refractory material. In other aspects, a substrate comprises a glass, a ceramic, a glass-ceramic, or a combination thereof. In various specific aspects, a substrate comprises cordierite, aluminum titanate, titania, alumina, such as, for example, α-alumina, γ-alumina, or other ceramic material and/or a combination thereof. In yet other aspects, a substrate comprises a carbon material, such as, for example, a glassy carbon. In still other aspects, a substrate comprises a metal, such as, for example, aluminum. In still other aspects, a substrate comprises a polymeric material, such as, for example, a thermoplastic. It should be noted that the present disclosure is not limited to the specific substrate materials recited herein and can thus comprise any suitable material, including, for example, a combination of any two or more recited materials. In various aspects, the substrate can comprise a solid material, a sponge, such as, for example, a metal or plastic sponge, a sintered material, or a combination thereof As such, a substrate can comprise, in various aspects, a porous material, a non-porous material, a semi-porous material, or a combination thereof In one aspect, a substrate can have a porous surface, and upon application of a coating to the porous surface, at least a portion of a coating can penetrate into the porous surface. In a specific aspect, at least a portion of a coating can penetrate at least a portion of the pores of a substrate. In another aspect, a coating can be applied to the porous surface of a substrate such that all or substantially all of the coating slurry penetrates into the porous surface, wherein a non-continuous coating is formed on the substrate surface. The term "coating" applies to all of these circumstances.

If a substrate comprises voids, channels, and/or other openings, excess coating material, if present, can optionally be removed after application using any suitable technique, such as, for example, blowing with compressed air.

In one aspect, once a substrate, such as a monolith, has been coated with, for example, a washcoat, the substrate can be dried, allowed to dry, and/or calcined. The parameters of a particular drying and/or calcining step can vary and one of skill in the art could readily select appropriate drying and/or calcining steps for a particular substrate and coating material. The substrate, for example, an uncoated substrate or a substrate coated with a washcoat, can be processed, in various aspects, separately from the catalyst or the supported catalyst. In certain applications, this can be an advantage of the present disclosure.

It is understood that the substrate of the disclosure can be used in combination with the methods, products, and applications of the disclosure.

First Washcoat

In various aspects, a washcoat of the present disclosure can comprise, for example, any salt species that is at least partially soluble in one or more polar organic solvents, water, or a combination thereof. In one aspect, the soluble washcoat salt species is at least partially soluble in water. In one aspect, the soluble washcoat salt species is at least partially soluble in a polar organic solvent. In another aspect, the soluble washcoat salt species is substantially soluble in a polar organic solvent. In various aspects, the soluble washcoat salt species has a solubility greater than about 1 ppm, such as, for example, about 1.5, 2, 5, 10, 50, 100, 200, 400, 500, 800, 1,000, 1,500, 2,000, 3,000, or 10,000 ppm; or greater than about 1,000 ppm, for example, about 1,000, 1,500, 2,000, 3,000, 5,000, 10,000, 15,000, 20,000, 30,000, 50,000 ppm or more in water, a polar organic solvent, or a combination thereof. It should be understood that the solubility of any particular soluble washcoat salt species can vary depending upon such factors as pH, temperature, the particular counterion of a salt species present, and/or the nature and polarity of the solvent employed, and the present disclosure is not intended to be limited to any particular level of solubility. It should be noted that the solvent of the present disclosure can comprise a polar solvent, water and that the soluble washcoat salt species should be at least partially soluble in the particular solvent and/or combination of solvents employed.

In other aspects, the soluble washcoat salt species can form a colloidal suspension and/or a sol in the particular solvent and/or combination of solvents employed, provided that at least a portion of the soluble washcoat salt species is at least partially ionized.

In one aspect, the soluble washcoat salt species comprises at least one soluble cationic species and at least one soluble anionic species. In various aspects, the soluble cationic species comprises a transition metal, an alkali metal, an alkali earth metal, a rare earth metal, or a combination thereof In various aspects, the soluble anionic species comprises a nitrate, a halide, a sulfate, a sulfite, a nitrite, a phosphate, a carbonate, an oxalate, a carboxylate (e.g., a formate or an acetate), or a combination thereof In other aspects, the soluble anionic species comprises a polyoxometalate (e.g., $[PMo_{12}O_{40}]^{3-}$) wherein a transition metal species is anionic and a counter ion (e.g., $[NH_4]^{1+}$) is cationic. In such an aspect comprising a polyoxometalate, such as, for example, $[PMo_{12}O_{40}]^{3-}$, a metal oxide, such as, for example, molybdenum oxide, can act as a binder.

In various aspects, the soluble washcoat salt species comprises an iron compound, a zinc compound, a copper compound, an aluminum compound, or a combination thereof In a specific aspect, the soluble washcoat salt species comprises an iron compound, such as, for example, iron nitrate, iron sulfate, iron chloride, or a combination thereof While not wishing to be bound by theory, it is believed that iron oxide can promote catalysis when used with certain metal catalyst particles dispersed on it and the presence of iron can help maintain small, high surface area, metal catalyst particles. In other aspects, the soluble washcoat salt species can comprise a hydroxide, such as, for example, iron hydroxide, an oxyhydride, or a combination thereof It should be noted that such oxide compounds can have limited solubility in water, a polar organic solvent, or a combination thereof, and that a suspension of at least partially soluble and/or partially ionized oxide compounds can be used either alone, or in combination with other soluble washcoat salt species.

The concentration of the soluble washcoat salt species can vary, depending upon the specific salt species, polar organic solvent, and conditions such as, for example, temperature and/or pH. In various aspects, the concentration of the soluble washcoat salt species can range from about 0.01 M to the maximum solubility limit of the salt; or from greater than about 0.01 M to about 10 M, for example, about 0.01, 0.02, 0.05, 0.08, 0.1, 0.2, 0.25, 0.3, 0.4, 0.5, 0.6, 0.7, 0.8, 0.9, 1.0, 1.1, 1.2, 1.3, 1.4, 1.5, 1.6, 1.8, 2, 2.5, 3, 3.5, 4, 5, 6, 7, 8, 9 or 10 M. In other aspects, the concentration of the soluble washcoat salt species can be less than about 0.01 M or greater than about 10.0 M, and the present disclosure is not intended to be limited to any particular concentration range. In one specific aspect, the soluble washcoat salt species comprises an iron nitrate and is present at a concentration of about 1.6 M. In other aspects, the soluble washcoat salt species can comprise multiple salt species having the same or different cations.

The polar organic solvent of the present disclosure can comprise any suitable polar organic solvent for at least partially solvating and/or dissolving the soluble washcoat salt species. In various aspects, the polar organic solvent can comprise an ethylene glycol monoethyl ether, an ethylene glycol monomethyl ether, a diethyl glycol monoethyl ether, a cellusolve compound, or a combination thereof In other aspects, the polar organic solvent can comprise any ethylene glycol derivative that can function as described herein.

The insoluble particulate material of the present disclosure can comprise any material suitable for use in the intended application. In one aspect, the insoluble particulate material can comprise a substantial portion of and/or the largest volume fraction of a washcoat composition. In various aspects, the insoluble particulate material can act as a binder and the coating composition requires no addition binder and/or binder materials. In one aspect, the insoluble particulate material comprises an oxide, such as, for example iron oxide, zinc oxide, tin oxide, ceria, titania, alumina, silica, spinel, perovskite, or a combination thereof In yet other aspects, the insoluble particulate material can comprise a carbide, a nitride, a particulate carbonaceous material (e.g., activated carbon and/or carbon black), or a combination thereof The insoluble particulate material can comprise a plurality of individual insoluble particulate materials having the same or different composition. In one aspect, the insoluble particulate material comprises an oxide, wherein the oxide comprises the same cation (e.g., metal) as the soluble washcoat salt species, or of at least one salt species of the soluble washcoat salt species if multiple salt species are present. In a specific aspect, the insoluble particulate material comprises an iron oxide.

In one aspect, a washcoat and/or an insoluble particulate material can itself be at least partially catalytically active. In a specific aspect, an insoluble particulate material is an oxide that exhibits catalytic activity. In another aspect, a washcoat and/or an insoluble particulate material does not exhibit any substantial catalytic activity.

The particular composition and/or phase of an insoluble particulate material can vary. In various aspects, the insoluble particulate material comprises alpha, gamma, delta, eta, theta, kappa, rho, and/or chi alumina, silica, silica aluminate, zeolite, silica-magnesia, titanium oxide, zirconium oxide, or a combination thereof The contemplated substrate coating can be of any desired thickness for a particular application. Typically, given that the substrate coating can serve to anchor the catalyst, the coating can have a thickness such that the optimal catalyst dispersion and exposure is achieved. In general, the present disclosure can allow for very thin coatings. Thicknesses of the coating can depend, in various aspects, on the particle size of the coating material. Again, the desired particle size of the coating material should be selected or processed based on the desired thickness of the catalyst and catalyst support particles such that good adhesion is achieved. Contemplated thicknesses for the coating include, without limitation, about 0.1, 0.2, 0.3, 0.4, 0.5, 0.6, 0.7, 0.8, 0.9, 1, 1.3, 1.4, 1.5, 1.6, 1, 8, 2, 2.3, 2.5, 2.7, 3, 3.5, 4, 5, 6, 8, 9, or 10 µm. The thickness of a coating can also be about 0.1, 0.2, 0.5, 0.8, 1, 2, 3, 4, or 5 mm. In one aspect, the thickness of a coating can be less than about 5 mm. Even thinner coating can include thicknesses of about 6, 7, 8, 9, 12, 20, 30, 40, 50, 60, 70, 80, 90, and 95 nm, and the present disclosure is not intended to be limited to any particular coating thickness.

The substrate coating can be bound to a catalyst or a supported catalyst through any appropriate means, for example, noncovalent and/or covalent bonding, physical adsorption, chemisorption, and/or any other adhesion mechanism. In various aspects of the present disclosure, the catalyst support can comprise a substance capable of hydrogen bonding with the substrate coating. In these examples, the catalyst support can comprise at least one hydrogen bond donor and/or at least one hydrogen bond acceptor. If a hydrogen bond acceptor is present, the hydrogen bond acceptor can comprise an electronegative atom. Typical electronegative atoms capable of hydrogen bonding include, without limitation, fluorine, oxygen, and nitrogen. If any of the aforementioned hydrogen bond acceptors are present, they can be bonded to a metal atom. If oxygen is present, for example, the oxygen can be bonded to a metal to form a metal oxide. Examples of metals oxides contemplated for use in at least a portion of the substrate coating include, without limitation, cerium oxides, copper oxides, zinc oxides, aluminum oxides, and/or any combination thereof. Other specific examples include, without limitation, $TiO_2$, $Al_2O_3$, $\gamma$-$Al_2O_3$, $SiO_2$, MgO, ZnO, $Fe_2O_3$, and/or any combination thereof. A further example comprises yttria and zirconia, such as, for example, yttria-stabilized zirconia.

Although not wishing to be bound by theory, if a hydrogen bond exists between the catalyst support and the substrate coating, the bond need not always be either the same type of bond and need not always be present. In one aspect, a powder catalyst support material comprises a metal oxide, wherein the powder is bonded to a substrate coating comprising a metal oxide through a hydrogen bond. After calcination of the powder and substrate coating, the hydrogen bond can form a metal oxygen bond with the dehydration.

Second Washcoat

The present disclosure comprises, in various aspects, a second washcoat. In various aspects, the second washcoat can comprise an oxide. In one aspect, the second washcoat comprises the same or substantially the same composition as the first washcoat. In another aspect, the second washcoat comprises an oxide material different from that and/or those utilized in the first washcoat. In yet another aspect, the second washcoat comprises an oxide-supported catalyst. The second washcoat can comprise any material suitable for catalyst immobilization. The second washcoat can, in various aspects be capable of binding to a substrate coating. In general, it can be advantageous in certain applications to have a second washcoat and a first washcoat comprised of similar sized particles such that, for example, good adhesion is obtained.

A second washcoat can be bound to a coated substrate, and/or a catalyst through any appropriate means. In certain aspects, a second washcoat and a coating and/or catalyst may be bound through an ionic, metallic, covalent, noncovalent, electrostatic, physical, and/or any other chemical or physiochemical bonding means. It is not necessary that a chemical bond or any particular type of bond be formed, provided that the second washcoat and/or catalyst sufficiently adhere to, for example, a substrate, so as to remain stable during the intended application. The present disclosure is not intended to be limited by the exact nature of the adhesion between the coated substrate and/or catalyst and the catalyst support. In one aspect, the bonding means that exists between the catalyst and the second washcoat composition is of a nature such that substantial wt. % loss of the catalyst does not occur during the application of the catalyst material.

In one aspect, a second washcoat, such as, for example, an oxide-supported catalyst, can be bound to a coated substrate through any appropriate means, for example, noncovalent and/or covalent bonding, physical adsorption, chemisorption, and/or any other adhesion mechanism. In various aspects of the present disclosure, the oxide or the oxide-supported catalyst can comprise a substance capable of hydrogen bonding with the coating of the coated substrate. In such aspects, an oxide-supported catalyst powder can comprise at least one hydrogen bond donor and/or at least one hydrogen bond acceptor. If a hydrogen bond acceptor is present, the hydrogen bond acceptor can comprise an electronegative atom. Typical electronegative atoms capable of hydrogen bonding can comprise, without limitation, fluorine, oxygen, and nitrogen. If any of the aforementioned hydrogen bond acceptors are present, they can optionally be bonded to a metal atom. If oxygen is present, for example, the oxygen can be bonded to a metal to form a metal oxide. Examples of metals oxides contemplated for use in at least a portion of the catalyst or supported catalyst include, without limitation, cerium oxide, copper oxide, zinc oxide, aluminum oxide, and/or any combination thereof. Other specific examples include, without limitation, $TiO_2$, $Al_2O_3$, $\gamma$-$Al_2O_3$, $SiO_2$, MgO, ZnO, $Fe_2O_3$, and/or any combination thereof. A further example comprises yttria and zirconia, such as, for example, yttria-stabilized zirconia.

Although not wishing to be bound by theory, a hydrogen bond between a second washcoat comprising, for example, an oxide-supported catalyst and a coated substrate can be intermittent and/or can vary. In one aspect, a second washcoat comprises a metal oxide, wherein the oxide-supported catalyst is bonded to a coating of a coated substrate comprising a metal oxide through a hydrogen bond. After calcination of a second washcoat and substrate coating, the hydrogen bond can form a metal oxygen bond.

In one aspect, the first washcoat forming the first or anchor layer, and the second washcoat comprising an oxide-supported catalyst can sufficiently adhere to each other to remain durable during operation, without the need for a binder material to be added to either of the washcoat compositions and/or be applied to the substrate or coated substrate.

In one aspect, the thickness of a layer formed from the second washcoat can be any suitable thickness for an intended application. In various aspects, the thickness of a second layer can range from about 1 nm to about 5 mm, from about 1 µm to about 1 mm, from about 5 µm to about 3 mm, or any combination of ranges therefrom. In other aspects, the thickness of a second layer can be thinner than about 1 µm or thicker than about 5 mm, and the present disclosure is not intended to be limited to any particular thickness. In another aspect, the combination of the thickness of an anchor layer formed from the first washcoat, and the thickness of a second layer formed from a second washcoat are less than about 5 mm.

The second washcoat can, in various aspects, comprise particles or species of any desired shape and size. The application at hand can often help determine a desired supported catalyst powder size and shape. In general, the size and shape of the components of the second washcoat can depend at least partially on the method of preparation. In various aspects, a second washcoat can comprise particles of colloidal size, e.g. between about 1 nm and about 1 μm. In such aspects, a fine colloidal particle size can be desirable to match the size of the supported catalyst powder to the size of a substrate coating material, thereby, for example, enhancing adhesion properties. Exemplary colloidal particle sizes include, without limitation, about 1, 2, 3, 4, 5, 6, 7, 8, 9, 10, 12, 14, 16, 18, 22, 30, 33, 37, 50, 60, 70, 80, 90, 100, 150, 150, 300, 500, 600, 700, 900, 950 nm, and any combination thereof. Other larger particles can also be suitable for use in the present disclosure, including, without limitation, particles with sizes of about 1, 1.5, 2, 2.5, 3, 3.5, 4, 4.5, 5, 5.5, 6, 7, 8, 9, 10, 11, 12, 13, 14, or 15 μm, and any combination thereof Larger particles can be reduced in size, if desired, by methods well-known in the art, such as ball-milling. The catalyst can be located in the interior and/or exterior of the second washcoat. It should be noted that each of the particulate materials utilized in the various aspects of the disclosure can have distributional properties, and as such, the size of any particle can comprise a range of individual particle sizes. As such, any individual size, range of sizes, and/or distribution of sizes are appropriate and intended to be covered by the disclosure.

Catalyst

The present disclosure can comprise, in various aspects, one or more catalysts. Any catalytic species compatible with the washcoats, substrates, coated substrates, and/or methods described herein is suitable. In some aspects, a desired catalyst is one that can benefit from immobilization (e.g. enhanced dispersion), for example, catalysts used in hydrodesulfurization, hydrogenation, methanation, methanol synthesis, ammonia synthesis, carbon monoxide oxidation, carbon-carbon bond forming reactions, and various petrochemical processes.

In one aspect, catalysts contemplated for use in various embodiments of the present disclosure can be, for example, redox catalysts (catalysts that are oxidized and/or reduced during a catalytic cycle). In another aspect, such redox catalysts can comprise at least one inorganic element. Given that transition metal elements, in particular, can have a variety of oxidation states, a catalyst, in various aspects, can comprise one or more individual transition metal elements. An exemplary catalyst can comprise: Cr, Mn, Ni, Cu, Zn, Y, Zr, Nb, Mo, Tc, Cd, Ru, Pd, Pt, Rh, V, Mo, Co, Os, Ir, or a combination thereof Other suitable catalysts can comprise elements from, for example, the poor metal group including, without limitation, Al, Si, Ga, In, or a combination thereof Multiple catalysts and/or multi-metallic catalysts can also be utilized in various aspects of the disclosure.

Other catalysts contemplated for use in the present disclosure include, without limitation, metal oxide catalysts. Specific examples include catalysts wherein the metal ion component comprises Cu, Ce, Zn, Pd, and Rh. Metal oxide catalysts comprising the aforementioned metal ion components can comprise $CuO-CeO_2$, $CuO-ZnO$, $Pd/Cu/ZnO$, $Pd/CuO/ZnO$, $Al_2O_3$ or a combination thereof Other aspects include catalysts comprising Rh and $Al_2O_3$. In one aspect, a catalyst comprising Rh and $Al_2O_3$ includes compositions wherein Rh is present in, for example, about 1 wt. % in the bulk catalyst composition. The specific concentration of a particular catalyst species in a catalyst composition, a washcoat composition, or a coated substrate can vary, for example, from about 0.1 wt. % to about 99 wt. %, from about 1 wt. % to about 80 wt. %, or from 1 wt. % to about 60 wt. %, depending upon such factors as the intended application or level of catalyst dispersion, and the present disclosure is not intended to be limited to any particular concentration of catalyst. In other aspects, an organometallic catalyst can be utilized. In certain aspects, if a calcination temperature is not sufficiently high to decompose any or all organic material that can be present, an organometallic catalyst can be utilized.

Any method for making a catalyst that is suitable with the methods and supported catalysts on substrates disclosed herein can be used. The aforementioned catalysts can be made, for example, using methods well known in the art. One such method, as not to limit the present disclosure, can comprise contacting two metal salts to form a catalytically active species and/or a catalyst precursor which can later be activated. In other aspects, after a supported catalyst on a substrate is processed, an activation and/or stabilization procedure can be carried out. A catalyst precursor can be treated, for example, such that an active catalyst is generated. One such method comprises reduction of a catalyst precursor to form an active catalyst. In various aspects, the reduction can be carried out with a flow of gas. In another aspect, a powdered metal salt comprising a halogen, typically Cl, is calcined to form a metal oxide, and is subsequently reduced and activated with a flow of $H_2$ gas. In this aspect, the $H_2$ gas can be carried in another inert gas, such as, for example, helium gas.

Catalyst loading in and/or on the second washcoat can be any appropriate wt. % of the bulk powder composition. In one aspect, the catalyst loading in and/or on the second washcoat can be, for example, 0.5, 1, 1.5, 2, 3, 4, 5, 6, 7, 8, 9, 10, 11, 12, 13, 14, 14.5, 16, 20, 21, 23, 24, or 25 wt. % of the bulk powder composition.

The catalyst, supported catalyst, and/or the second washcoat can be characterized, if desired, using methods well known in the art. For example, surface areas of catalysts can be estimated by a $N_2$ adsorption method. Estimation of the surface area of a supported catalyst can be useful to identify structure property relationships, but the present disclosure does not intend to be limited by surface areas of supported catalyst compositions. Further characterization can be carried out using, for example, X-ray powder diffraction. Infrared spectroscopy can also be useful in determining catalyst activity. If, for example, a particular catalyst of the present disclosure can oxidize CO, then IR spectroscopy can be used to monitor the disappearance of the stretching frequency attributable to the sp hybridized bond of CO. While such techniques can be useful to estimate the activity of a supported catalyst, the present disclosure is not intended to be limited by any specific catalytic activity of a supported catalyst composition.

Any appropriate method to manufacture the supported catalyst of the present disclosure can be used. In one aspect, the physico-chemical properties of a supported catalyst can be linked to a preparation method. As such, given that the present disclosure is contemplated for use in a variety of applications, the preparation method is not a limiting feature of the present disclosure.

Conventional methods that can be employed for supporting a catalyst on and/or in a catalyst support can comprise deposition-precipitation, co-precipitation, vapor deposition, zeolite formation, chemisorption, physisorption, chemi-/physisorption, impregnation methods, wet impregnation, dry impregnation techniques, and combinations thereof One advantage of the present disclosure is that any catalyst preparation method can be employed provided that the substrate coating and the substrate itself can be processed separately from the catalyst and catalyst support. Certain methods, such as, for example, a co-precipitation method, can be incompatible with certain substrate and substrate coating processing methods. The present disclosure can at least partially overcome such limitations.

It should be appreciated that a catalyst on a substrate can be utilized in the green or unfired state, such that upon exposure to operating temperatures, the materials utilized therein will become fixed or calcined. In another aspect, a coated substrate and/or a supported catalyst on a substrate can be heated, dried, fired, and/or calcined at any point prior to or during use.

It should be understood that the method for providing a catalyst on a substrate of the disclosure can be used in combination with the methods, products, and applications of the disclosure.

In various aspects, a coated substrate can be contacted with a solution of catalyst before or after heating, drying, firing, and/or calcining the coated substrate. In other aspects, one or more of the washcoats described herein can be catalytically active and/or can further comprise a catalyst, such that a washcoated substrate exhibits catalytic activity.

In one aspect, a second washcoat, when applied to a coated substrate, can form a second layer coating. Such a second coating, in various aspects, can be any suitable thickness and can be continuous or discontinuous over any portion of the whole of a substrate surface. In a specific aspect, the second washcoat composition forms a continuous coating. In another aspect, the second washcoat composition forms a substantially uniform continuous coating on a coated substrate. In yet another aspect, the second washcoat composition forms one or more discrete coating regions on a coated substrate.

It should be understood that the catalyst of the disclosure can be used in combination with the compositions, methods, products, and applications of the disclosure.

With reference to FIG. 1, a supported catalyst on a substrate 100, prepared in accordance with various aspects of the present disclosure is illustrated. A substrate 140 coated with an anchor layer 130 from a first washcoat is depicted. The coated substrate also comprises a plurality of supported catalyst particles 110 in a second layer, formed from a second washcoat. In FIG. 1, an exploded view of an exemplary supported catalyst particle 110 is depicted, wherein the exploded view of the exemplary supported catalyst particle located in the circular dotted line is illustrated above the substrate. Each of the plurality of supported catalyst particles 110 can comprise a plurality of individual catalyst particles 120 positioned on the surface thereof. Each of the plurality of supported catalyst particles 110 can, depending upon the specific material employed, also exhibit one or more bonding forces, 150, such as, for example, hydrogen bonding. Such bonding forces, if present, can facilitate bonding between the supported catalyst particles, anchor layer, and/or substrate.

Likewise, the substrate coating can be bound to a substrate through any appropriate means. Examples include physical and chemical means. Specific examples include substrate coatings chemisorbed to the substrate, while other examples include substrate coatings physisorbed to the substrate, while still other examples include substrate coatings both chemisorbed and physisorbed to the substrate.

EXAMPLES

To further illustrate the principles of the present disclosure, the following examples are put forth so as to provide those of ordinary skill in the art with a complete disclosure and description of how the compositions, articles, and methods claimed herein are made and evaluated. They are intended to be purely exemplary of the disclosure and are not intended to limit the scope of what the applicants regard as their disclosure. Efforts have been made to ensure accuracy with respect to numbers (e.g., amounts, temperatures, etc.); however, some errors and deviations should be accounted for. Unless indicated otherwise, temperature is ° C. or is at ambient temperature, and pressure is at or near atmospheric. There are numerous variations and combinations of process conditions that can be used to optimize product quality and performance. Only reasonable and routine experimentation will be required to optimize such process conditions.

Example 1

Method for Making a Supported Catalyst for CO Oxidation (Prophetic)

In a first example, an active $CuO$—$CeO_2$ catalyst powder can be prepared. For selective CO oxidation, $CuO$—$CeO_2$ can be an active catalyst. A $CuO$—$CeO_2$ catalyst can typically be calcined at temperatures greater than about 600° C. It can be advantageous to calcine a supported catalyst in the absence of a substrate, particularly if the substrate can be adversely affected at such a calcination temperature. The present disclosure can, for example, allow for a supported catalyst powder to be processed, calcined, and subsequently applied to a substrate or a coated substrate.

The supported catalyst powder can be prepared by dissolving $Cu(NO_3)_2$ and $Ce(NO_3)_3$ in water in an amount such that after calcination, $CuO$ is present at about 5 wt. % of the total powder. A salt solution and $NH_4OH$ can be simultaneously added to water with stirring at a temperature greater than about 75° C., and preferably less than about 90° C. The resulting precipitate can be allowed to age for about 1-2 hr, followed by centrifugation and washing. The precipitate powder can then be dried and calcined at about 700° C. for at least about 3 hr in air. The powder can then be ground to an appropriate particle size, preferably less than about 5 µm.

A washcoat, which can produce a coating compatible with the aforementioned powder supported catalyst, can be prepared separately. For example, a slurry of finely grounded $CeO_2$ can be added to a solution of $Ce(NO_3)_3$ dissolved in a polar organic solvent, such as, for example, diethylene glycol monoethyl ether, cellusolve, or a combination thereof.

A substrate, such as a monolith, can be coated with the slurry by exposing the substrate to the slurry solution. The resulting coating substrate can then comprise a layer having properties such that the aforementioned powder supported catalyst can bind to the layer.

The coated substrate could then be exposed to a slurry of the powder supported catalyst so as to produce a catalyst coating. The resulting substrate can then be dried and calcined at a temperature of, for example, about 400° C. The particular catalyst loading can be affected by the viscosity of the catalyst powder slurry. The viscosity of the catalyst powder slurry can be lowered, if desired, through the addition of a polar organic solvent to the slurry and/or through the addition of surfactants.

Example 2

Method for Making a Supported Pd/Zn/Cu Catatlyst (Prophetic)

In a second example, a Pd/Zn/Cu based catalyst can be prepared. In contrast to Example 1, ZnO can be used in lieu of $CeO_2$. In addition, $Pd(NO_3)_2$ can be added. The supported catalyst powder can be prepared by dissolving $Ce(NO_3)_2$, $Zn(NO_3)_3$, and $Pd(NO_3)_3$ in water, and the resulting solution can be heated to a temperature of greater than about 60° C. To this solution, aqueous $Na_2CO_3$ can be slowly added to raise the pH to a value greater than about 9 such that the salt begins to precipitate. The precipitated salt can then be aged for about 1-3 hr. The precipitate can subsequently be centrifuged, washed, dried, and calcined at a temperature between about 350-500° C.

A coating solution, capable of producing a coating compatible with the aforementioned powder supported catalyst, can be prepared separately. For example, a slurry of finely grounded CuO—ZnO, having median particle sizes of less than about 5 μm, can be added to a solution of both $Cu(NO_3)_3$ and $Zn(NO_3)_3$ dissolved in a polar organic solvent, such as, for example deithylene glycol monoethyl ether, cellusolve, or a combination thereof. The concentration of the solution should be such that the Cu:Zn ratio in solution is approximately 1, and wherein the resulting processed powder will yield about 5-25 wt. % CuO—ZnO of the total composition after calcination. An aqueous slurry of the Pd/Cu/ZnO catalyst powder can then be made.

A substrate, such as a monolith, can be coated with the slurry by exposing the substrate to the slurry solution. The resulting coated substrate can comprise a layer with properties such that the powder supported catalyst can bind to the layer. The resulting coated substrate can then be dried.

Example 3

Method for Making a Pd/Zn/Cu Supported Catalyst on a High Surface Area Substrate (Prophetic)

In a third example, the procedure described above in Example 2 can be used to coat a high surface area substrate. In this example, a substrate coating can comprise $\gamma$-$Al_2O_3$. A slurry of $\gamma$-$Al_2O_3$ can be prepared in a diethylene glycol monoethyl ether solution, and can be combined with boehmite (AlOOH), such that the amount of boehmite present, after calcinations, is approximately equivalent to about 20 wt. % $Al_2O_3$ in the slurry. A substrate can be coated with the slurry, dried and calcined at about 500° C. The catalyst coating can be prepared from any appropriate catalyst, such as, for example, the catalyst of Example 2, Pd/Cu/ZnO. The resulting bilayered substrate can then be calcined.

Example 4

Method for Making a Supported Rh Catalyst (Prophetic)

In a fourth example, a supported Rh catalyst can be prepared using methods analogous to the methods disclosed in Examples 1-3. $RhCl_3$ can be dissolved in an aqueous solution, and the resulting solution can be mixed with $\gamma$-$Al_2O_3$, such that after drying and calcinations, the supported catalyst comprises about 1 wt. % Rh/$\gamma$-$Al_2O_3$. With stirring, an aqueous solution comprising about 0.1 M $Na_2CO_3$ can be added to the mixture to slowly raise the pH to greater than about 9, so as to induce precipitation of Rh into the alumina suspension. The resulting precipitate can be aged for about 1-3 hr, followed by centrifugation, washing, and drying to produce a catalyst powder. The resultant catalyst powder can then be calcined at about 450° C. for about 3 hr.

A slurry of $\gamma$-$Al_2O_3$ in diethylene glycol monoethyl ether can be mixed with boehmite, AlOOH, such that the AlOOH after calcinations is present in an amount approximately equivalent to about 20 wt. % $Al_2O_3$ in the slurry. A substrate, for example, a monolith, can be coated with the resulting slurry such that the coating layer is less than about 2 μm thick and preferably less than about 1 μm thick. The coated substrate can then be dried and calcined at about 500° C. The slurry of Rh/$\gamma$-$Al_2O_3$ can then be added to the coated substrate and the resulting bilayer substrate can be dried and calcined. In this example, the thin layer of coated $Al_2O_3$ can serve to provide (1) a high surface area and (2) a plurality of surface hydroxyl functional groups to disperse and/or anchor the catalyst. The hydrogen bonds formed between the coating layer and the catalyst layer can, in certain aspects, form into metal oxygen bonds at elevated temperatures.

Lastly, it should be understood that while the present disclosure has been described in detail with respect to certain illustrative and specific examples thereof, it should not be considered limited to such, as numerous modifications are possible without departing from the broad spirit and scope of the present disclosure as defined in the appended claims.

What is claimed is:

1. A method for providing a catalyst on a substrate, the method comprising:
   a) providing a first washcoat comprising a soluble washcoat salt species, a polar organic solvent, and an insoluble particulate material, and wherein the first washcoat does not comprise a precious metal catalyst;
   b) contacting the first washcoat with a substrate to form a coated substrate; and then
   c) contacting the coated substrate with a second washcoat comprising an oxide or an oxide-supported catalyst to physisorb, chemisorb, bond, or otherwise adhere the oxide or the oxide-supported catalyst to the coated substrate.

2. The method of claim 1, wherein the insoluble particulate material is an oxide.

3. The method of claim 1, wherein the soluble washcoat salt species and the insoluble particulate material comprise a same cation.

4. The method of claim 1, wherein the soluble washcoat salt species comprises an iron compound, a cerium compound, a copper compound, an aluminum compound, a titanium compound, a silicon compound, a magnesium compound, a yttrium compound, a zirconium compound, a zinc compound, or a combination thereof.

5. The method of claim 1, wherein the soluble washcoat salt species comprises at least one of a nitrate, a halide, a carboxylate, or a combination thereof.

6. The method of claim 1, wherein the polar organic solvent comprises ethylene glycol monoethyl ether, ethylene glycol monomethyl ether, diethylene glycol monoethyl ether, cellusolve, or a combination thereof.

7. The method of claim 1, further comprising, at least one of heating, drying, firing, calcining, or a combination thereof the coated substrate.

8. The method of claim 1, wherein the second washcoat is made by combining a solvent and an oxide or an oxide-supported catalyst in powder form.

* * * * *